(12) United States Patent
Glickman et al.

(10) Patent No.: US 7,162,092 B2
(45) Date of Patent: Jan. 9, 2007

(54) SYSTEM AND METHOD FOR PROCESSING IMAGE DATA

(75) Inventors: Jeff Glickman, Las Vegas, NV (US); Rene Poston, Portland, OR (US)

(73) Assignee: InFocus Corporation, Wilsonville, OR (US)

( * ) Notice: Subject to any disclaimer, the term of this patent is extended or adjusted under 35 U.S.C. 154(b) by 449 days.

(21) Appl. No.: 10/735,306

(22) Filed: Dec. 11, 2003

(65) Prior Publication Data
US 2005/0129318 A1 Jun. 16, 2005

(51) Int. Cl.
*G06K 9/36* (2006.01)
*G06K 9/60* (2006.01)
*G06K 9/00* (2006.01)

(52) U.S. Cl. ...................... 382/233; 382/305

(58) Field of Classification Search ............... 382/162, 382/164, 165, 232, 233, 240, 305, 307; 375/240.01, 375/240.11, 240.21, 240.25; 348/391.1; 709/223; 725/74; 341/67; 345/602, 619; 711/168, 200; 365/230.05; 353/122
See application file for complete search history.

(56) References Cited

U.S. PATENT DOCUMENTS

| | | | |
|---|---|---|---|
| 5,450,130 A * | 9/1995 | Foley ....................... 348/391.1 |
| 5,612,744 A | 3/1997 | Lee et al. |
| 5,658,063 A | 8/1997 | Nasserbakht |
| 5,757,970 A | 5/1998 | Callahan et al. |
| 5,847,748 A | 12/1998 | Laughlin |
| 5,940,049 A | 8/1999 | Hinman et al. |
| 6,118,724 A * | 9/2000 | Higginbottom ........ 365/230.05 |
| 6,182,075 B1 | 1/2001 | Hsu |
| 6,289,138 B1 * | 9/2001 | Yip et al. ................... 382/307 |
| 6,311,258 B1 * | 10/2001 | Gibson et al. .............. 711/200 |
| 6,438,603 B1 | 8/2002 | Ogus |
| 6,507,898 B1 * | 1/2003 | Gibson et al. .............. 711/168 |
| 6,560,637 B1 | 5/2003 | Dunlap et al. |
| 6,573,846 B1 * | 6/2003 | Trivedi et al. ................ 341/67 |
| 6,693,643 B1 * | 2/2004 | Trivedi et al. .............. 345/602 |
| 6,707,463 B1 * | 3/2004 | Gibson et al. .............. 345/619 |
| 6,728,753 B1 | 4/2004 | Parasnis et al. |
| 6,735,616 B1 | 5/2004 | Thompson et al. |
| 6,860,609 B1 * | 3/2005 | Olson et al. ................ 353/122 |
| 2003/0110217 A1 | 6/2003 | Raju |
| 2004/0039833 A1 | 2/2004 | Ludwig et al. |
| 2004/0117445 A9 | 6/2004 | Lee et al. |

(Continued)

FOREIGN PATENT DOCUMENTS

JP 2000152202 5/2000

(Continued)

OTHER PUBLICATIONS

Babel, Marie and Olivier Deforges. "Lossless and lossy minimal redundancy pyramidal decomposition for scalable image compression technique." ICASSP, 2003: 249-252. Rennes, France.

(Continued)

*Primary Examiner*—Andrew W. Johns
*Assistant Examiner*—Amir Alavi
(74) *Attorney, Agent, or Firm*—Alleman Hall McCoy Russell & Tuttle LLP

(57) ABSTRACT

A method of decompressing a set of subsampled image data is disclosed. The method includes reading a first subset of the subsampled image data into a cache memory and into a buffer, wherein the buffer has an amount of memory equal to or less than the cache memory, calculating chrominance values for at least some pixels of the subset of the subsampled image data to form decompressed image data, and outputting the decompressed image data.

40 Claims, 3 Drawing Sheets

U.S. PATENT DOCUMENTS

| | | |
|---|---|---|
| 2005/0021821 A1 | 1/2005 | Tumbull et al. |
| 2005/0105608 A1* | 5/2005 | Coleman et al. ........ 375/240.01 |
| 2005/0114894 A1* | 5/2005 | Hoerl ........................... 725/74 |
| 2005/0125519 A1* | 6/2005 | Yang et al. .................. 709/223 |
| 2005/0129318 A1* | 6/2005 | Glickman et al. ........... 382/233 |

FOREIGN PATENT DOCUMENTS

| | | |
|---|---|---|
| WO | WO 00/27076 | 5/2000 |

OTHER PUBLICATIONS

Digital Display Working Group. "Digital Visual Interface DVI, Revision 1.0." 1999, 1-76.

Ebrahimi, Touradj and Caspar Horne. "MPED-4 natural video coding—An overview." Signal Processing: Image Communications 15 (2000) 365-385. Fremont, CA.

International Telecommunication Union. "Series T: Terminal Equipments and Protocols for Telematic Services (Data Protocols for Multimedia Conferencing)." ITU-T Recommendati.

VIS-INNOV.COM. "Notevision5 (XG-NV5XU)." Vis-innov.com, Mar. 21, 2001: 1-3. http://www.vis-innov.com/products/projectr/sharp/nv5.html.

You, Yu-Li and M. Kaveh. "Pyramidal Image Compression Using Anisotropic and Error-Corrected Interpolation." Department of Electral Engineering, University of Minnesota: 1-3.

* cited by examiner

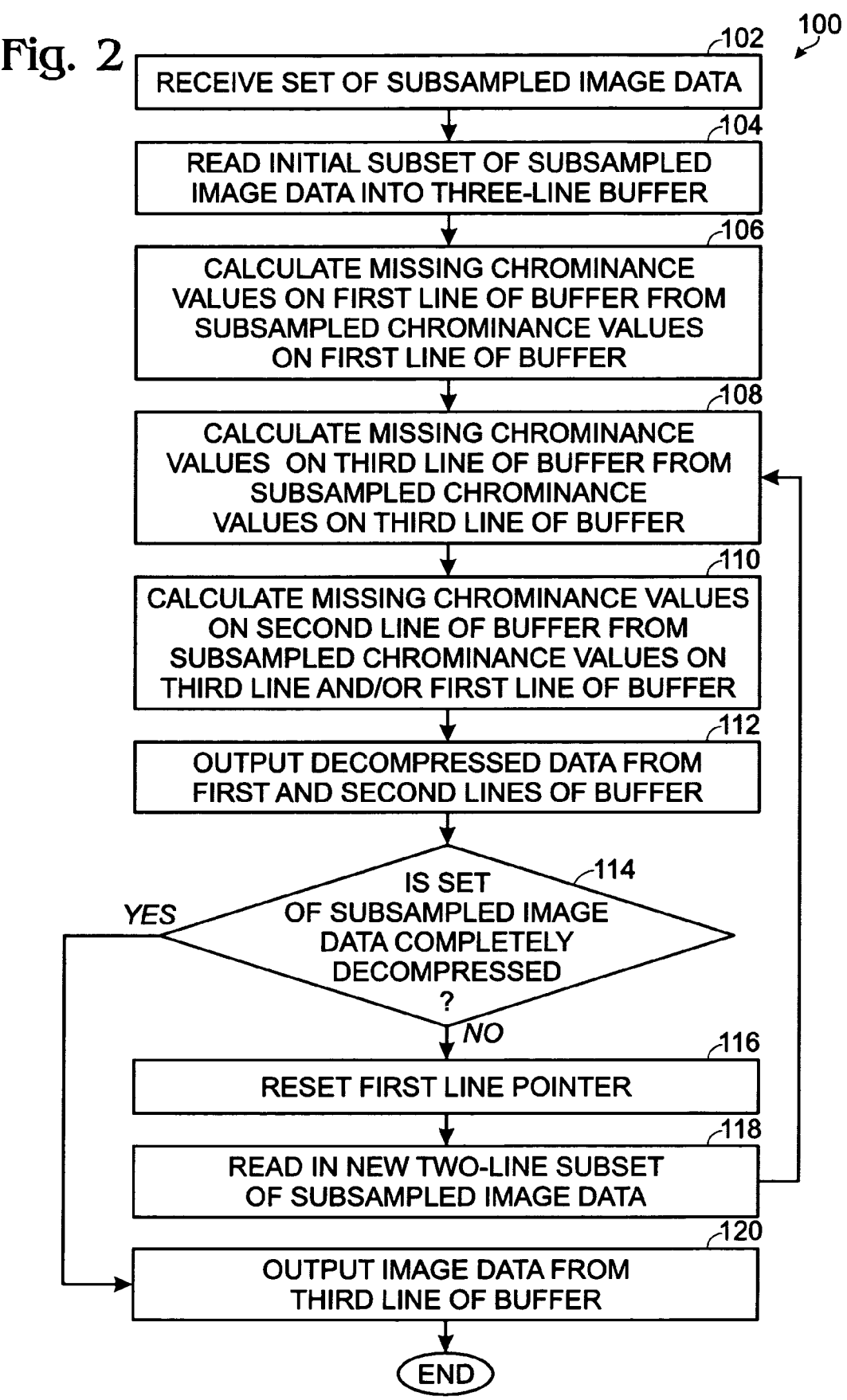

SYSTEM AND METHOD FOR PROCESSING IMAGE DATA

BACKGROUND

Image data is often stored and transmitted in a compressed format. The compression of image data reduces the amount of memory utilized by storage of the data, and also decreases the amount of time needed to transmit the image data across a communications channel with a limited bandwidth compared to uncompressed data.

Many different types of data compression techniques are known. One type of compression commonly used with image data is subsampling. Each pixel of color image data in an image may be described as a set of three coordinates or components that locate the color of the pixel in a selected color space. Subsampled image data is image data that has at least one color component sampled at a lower spatial frequency than the other color components.

One type of subsampling used in some color spaces is referred to as "4:2:2" subsampling. This type of subsampling is typically used in color spaces that describe an image in the terms of a luminance (or brightness) component and two chrominance (or color) components. 4:2:2 subsampling involves sampling the chrominance components at the same spatial frequency as the luminance component along the vertical direction, but at one-half the spatial frequency of the luminance component in the horizontal direction. Another type of subsampling is referred to as "4:2:0" subsampling. This is similar to 4:2:2 subsampling, but involves sampling the chrominance components at one-half the spatial frequency of the luminance component in both the vertical and horizontal directions.

In the decompression of subsampled image data, the subsampled data typically is read into a buffer configured to hold an entire frame of the data, and then the missing chrominance values are calculated from the subsampled chrominance values. In some decompression systems, the data also may be read into a cache memory as it is being read into the buffer. Cache memory is a higher speed memory associated with many processors, and is used to increase processor speed. When the processor needs a value for a calculation, it checks the cache memory first. Where the value is not in the cache memory, the processor must then find the value in the buffer stored in slower general memory. This is known as a "cache miss." Significant numbers of cache misses may slow down processing speed.

Cache memory typically has a small size relative to general memory. For image data in a high-resolution format such as XGA, a buffer configured to hold an entire frame of data may be larger than the cache. In this case, some image data in the cache memory may be written over by other image data as the data is read into the cache memory and the buffer. This may cause cache misses during the calculation of the missing chrominance values. The generation of too many cache misses may slow down image data processing, and thus may negatively affect the decompression and presentation performance of subsampled video image data, which typically must be decompressed at a rate of approximately 25 frames/second or faster.

SUMMARY

One embodiment provides a method of decompressing a set of subsampled image data. The method includes reading a first subset of the subsampled image data into a cache memory and into a buffer, wherein the buffer has an amount of memory equal to or less than the cache memory, calculating chrominance values for at least some pixels of the subset of the subsampled image data to form decompressed image data, and outputting the decompressed image data.

BRIEF DESCRIPTION OF THE DRAWINGS

FIG. 2 is a flow diagram of a method of decompressing subsampled image data according to another embodiment of the present invention.

DETAILED DESCRIPTION OF THE DEPICTED EMBODIMENTS

Figure 1:
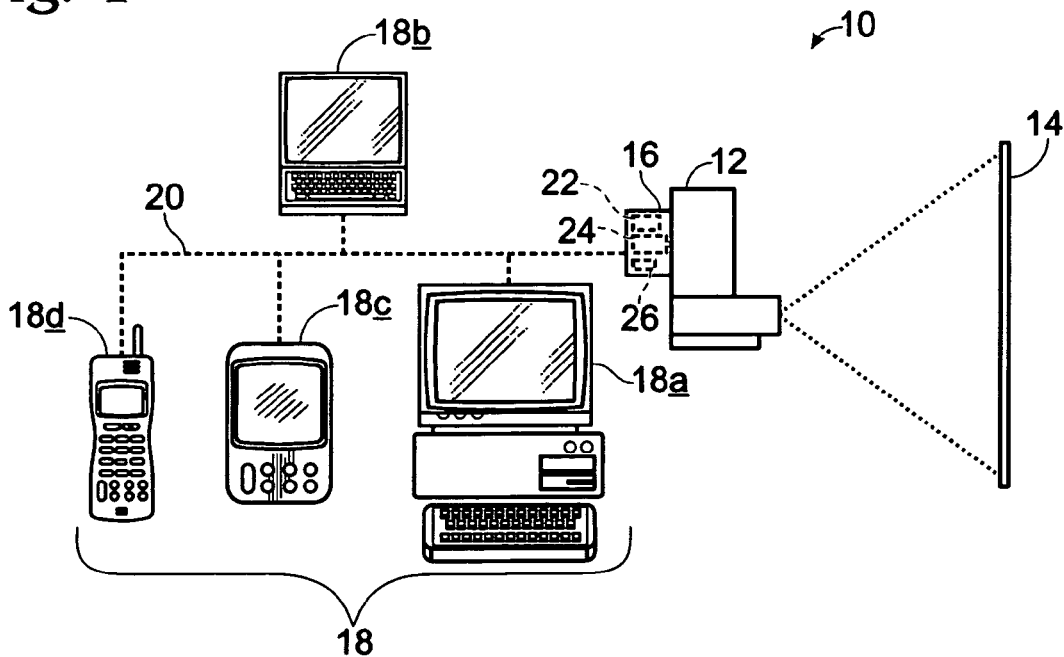
FIG. 1 is a schematic depiction of an image data processing system according to an embodiment of the present invention.

FIG. 1 shows, generally at 10, a schematic depiction of an image processing system according to a first embodiment of the present invention. Image processing system 10 includes a display device 12 configured to display an image on a viewing surface 14. Display device 12 may be any suitable type of display device. Examples include, but are not limited to, liquid crystal display (LCD) and digital light processing (DLP) projectors using either front or rear projection, television systems, computer monitors, etc.

Image processing system 10 also includes an image-rendering or processing device 16 associated with display device 12, and one or more image sources 18 in electrical communication (wired, radio. or any other suitable type of electrical communication) with image-rendering device 16. Image-rendering device 16 is configured to receive image data transmitted by image sources 18, and to render the received image data for display by display device 12. Image-rendering device 16 may be integrated into display device 12, or may be provided as a separate component that is connectable to the display device. An example of a suitable image-rendering device is disclosed in U.S. patent application Ser. No. 10/453,905, filed on Jun. 2, 2003, which is hereby incorporated by reference.

Image sources 18 may include any suitable device that is capable of providing image data to image-rendering device 16. Examples include, but are not limited to, desktop computers and/or servers 18a, laptop computers 18b, personal digital assistants (PDAs) 18c, mobile telephones 18d, etc. Additionally, image sources 18 may communicate electrically with image-rendering device 16 in any suitable manner. In the depicted embodiment, each image source 18 communicates electrically with image-rendering device 16 over a wireless network 20. However, image sources 18 may also communicate with image-rendering device 16 over a wired network, over a wireless or wired direct connection, etc. or any mixture or combination thereof.

Image data may be compressed for transmission from image sources 18 to image-rendering device 16. As described above, one way in which the image data may be compressed is via subsampling, which is defined as the sampling of one or more color space components at a lower spatial frequency than the other color space components. Where image sources 18 are configured to provide chrominance-subsampled image data, such as 4:2:2 or 4:2:0 subsampled image data, to image-rendering device 16, the image-rendering device typically decompresses the subsampled image data by calculating missing chrominance values from the subsampled chrominance values.

Known decompression systems for decompressing subsampled image data typically read an entire compressed image into a decompression buffer before calculating the missing chrominance values. Often, the compressed image data is copied into a cache memory as it is read into the buffer. The cache memory and buffer on image-rendering device 16 are shown at 24 and 26, respectively, and a processor is shown at 22. However, because the size of a compressed image may be larger than the cache memory, some image data in the cache memory may be overwritten by other image data as the compressed image data is copied into the buffer. The overwriting of image data in the cache memory may cause cache misses when the processor that is decompressing the image data looks for the overwritten data in the cache memory. The occurrence of too many cache memories may slow down image decompression to a detrimental extent.

To help avoid the occurrence of cache misses, image-rendering device 16 (or display device 12) may include a decompression buffer that is smaller than a cache memory located on the image-rendering device. Because cache memory is typically a relatively small memory, such a decompression buffer may also be smaller than a decompressed image. In other words, where the image data represents an image having an A×B array of pixels (where A is a number of columns and B is a number of rows of pixels of an image), the decompression buffer may be configured to hold an A×C array of image data, wherein C is less than B. Such a buffer may be used to decompress a set of subsampled image data by reading the set of subsampled image data into the buffer and cache memory as a series of smaller subsets of image data. Each subset of image data may be decompressed and output from the buffer before a new subset of the compressed image data is read into the decompression buffer. Because the decompression buffer is smaller than the cache memory, it is less likely that any image data in the cache memory will be overwritten while being used for decompression calculations.

The decompression buffer may have any suitable size. Generally, the smaller the decompression buffer is relative to the cache memory, the lower the likelihood of the occurrence of significant numbers of cache misses. Furthermore, the type of subsampled image data to be decompressed in the decompression buffer and the types of calculations used to decompress the compressed image data may influence the size of the decompression buffer. For example, the missing chrominance components in 4:2:0 image data may be calculated differently depending upon whether the subsampled chrominance values are co-sited or non-co-sited. Co-sited chrominance values are positioned at the same physical location on an image as selected luminance values, while non-co-sited chrominance values are positioned interstitially between several associated luminance values. The missing chrominance values of 4:2:0 co-sited image data may be calculated from subsampled chrominance values either on the same line as the missing values, or on adjacent lines, depending upon the physical location of the missing chrominance value being calculated. Thus, a decompression buffer for decompressing 4:2:0 image data, which has lines of data having no chrominance values, may be configured to hold more than one line of image data to allow missing chrominance values to be calculated from vertically adjacent chrominance values.

FIG. 2 shows, generally at 100, an embodiment of an exemplary method for decompressing 4:2:0 co-sited image data. Method 100 utilizes a three-line decompression buffer (i.e. C=3 for the above-described A×C decompression buffer) that allows missing chrominance data to be calculated from both horizontally and vertically adjacent subsampled chrominance values. Method 100 is typically embodied in code stored in memory 24 on image-rendering device 16 and is executed by processor 22 on image-rendering device 16, but also may be embodied in code that is stored in memory projector device 12, or elsewhere on network 20.

Method 100 first includes receiving a set of subsampled image data at 102. Because a single set of image data is often compressed in multiple ways for transmission, the set of subsampled image data received at 102 may be received from another decompressor program. Alternatively, the set of subsampled image data received at 102 may be received directly from one of image sources 18. Next, an initial subset of the subsampled image data is read into the three-line decompression buffer at 104. The initial subset of the subsampled image data read into the decompression buffer at 104 typically is as large as the decompression buffer. In other words, where the decompression buffer is configured to hold three lines of image data, a three-line subset of the subsampled image data is read into the decompression buffer at 104. The initial subset of image data may be taken from any desired portion of the set of subsampled image data. For example, either the top three lines, the bottom three lines, or any desired intermediate three lines of the A×B image data may be read into the decompression buffer at 104 for decompression.

After reading the initial subset of subsampled image data into the three-line buffer at 104, the missing chrominance values are calculated from the subsampled chrominance values. The missing chrominance values may be calculated from the subsampled chrominance values in any suitable manner, and in any suitable order. In the exemplary embodiment of FIG. 2, the missing chrominance values on the first line of the buffer are first calculated at 106, and those on the third line of the buffer are calculated next at 108. These calculations are illustrated schematically in FIG. 3, which depicts the three-line decompression buffer at 200, the first line of the decompression buffer at 202, the second line of the buffer at 204, and the third line of the buffer at 206.

Each pixel of the image is represented by a single location 208 in decompression buffer 200. Each location 208 typically has enough memory to hold a luminance value, two chrominance values, and any other data associated with a single pixel of decompressed image data. Luminance values are represented by squares 210 at each location 208 in the buffer containing a luminance value (i.e. all locations for 4:2:0 subsampled image data), and the co-sited chrominance values are represented by circles 212 at the memory locations in the buffer containing the luminance values with which the subsampled chrominance values are co-sited. It can be seen that the chrominance values of the data in decompression buffer 200 are sampled at only half the frequency of the luminance values in both vertical and horizontal directions. A software pointer, represented schematically by arrow 214 in FIG. 3, may be provided to indicate to the decompressor program which line of buffer 200 is considered the first line for purposes of decompression calculations. Pointers (not shown) may also be used to indicate which lines of buffer 200 are the second and third lines.

The calculation of the missing chrominance values in first line 202 and third line 206 from the subsampled chrominance values in the first line is indicated schematically by arrows 216. In the depicted embodiment, the missing chrominance values in first line 202 are calculated from immediately horizontally adjacent subsampled chrominance values, but may also be calculated from vertically adjacent chrominance values where suitable. While each missing chrominance value is depicted as being calculated from the subsampled chrominance value to the immediate left, it will be appreciated that each missing chrominance value also may be calculated from the subsampled chrominance value to the immediate right, as depicted by arrows 216'. Where the missing chrominance values are calculated from subsampled chrominance values to the immediate right, the final chrominance value in a line of data may be filled in by copying the second-to-last value in the line. The actual calculations used to determine the missing chrominance values are well known to one skilled in the art, and are thus not described in further detail.

Figure 3:
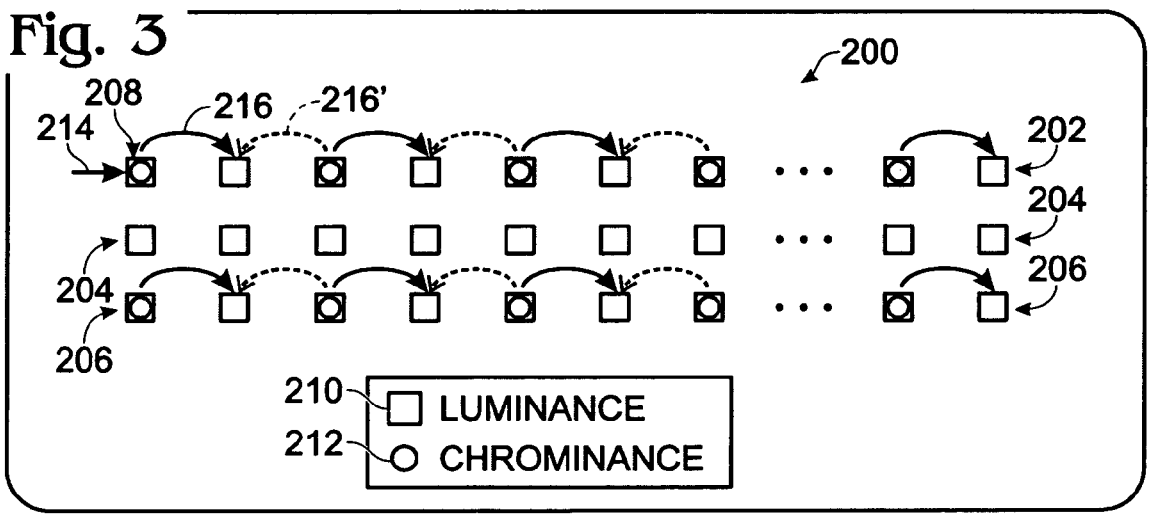
FIG. 3 is a schematic depiction of an exemplary decompression buffer containing 4:2:0 subsampled image data.

While FIGS. 2 and 3 depict the missing chrominance values on the third line being calculated before the missing chrominance values on the second line, it will be appreciated that the missing chrominance values on the second line may be calculated either before or after the missing chrominance values on the third line.

Figure 4:
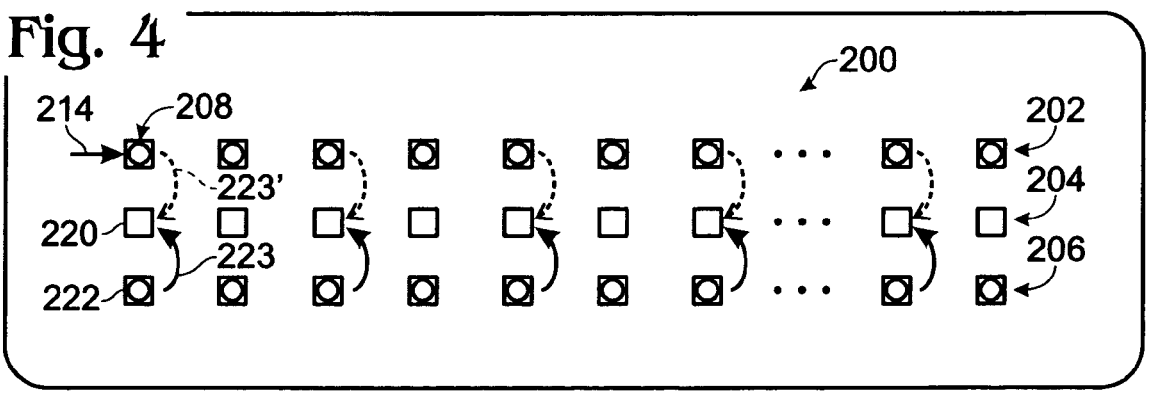
FIG. 4 is a schematic depiction of the buffer of FIG. 3, after calculating the missing chrominance values in the first line of the buffer.

The missing chrominance values on second line 204 and third line 206 of buffer 200 may be calculated in any suitable manner. FIG. 4 depicts a schematic representation of an exemplary calculation of a first portion of the missing chrominance values in second line 204 of decompression buffer 200 from the subsampled chrominance values in third line 206. Because the data in buffer 200 is 4:2:0 subsampled data, every other line of the data has no chrominance values. Thus, the missing chrominance values in these lines may be calculated from subsampled chrominance values in the lines immediately above and/or below. In FIG. 4, alternating missing chrominance values 220 in second line 204 of decompression buffer 200 are calculated from chrominance values 222 located immediately below in third line 206 of the decompression buffer, as depicted by arrows 223. Alternatively, the missing chrominance values are calculated from the chrominance values located immediately above the missing chrominance values, as indicated by dashed-line arrows 223'. Where the missing chrominance values in second line 204 are calculated from the subsampled chrominance values in the line immediately below, and wherein the last line in a set of image data includes missing chrominance values, the missing chrominance values may be calculated or copied from the line of data immediately above. As with the missing chrominance values on first line 202 and third line 206, the actual calculations used to calculate the missing chrominance values in second line 204 are known to one skilled in the art, and thus are not described in detail herein.

Figure 5:
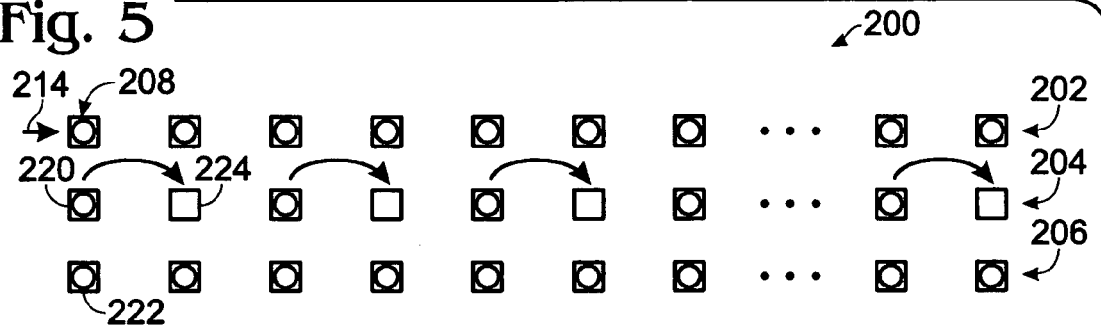
FIG. 5 is a schematic depiction of the buffer of FIG. 3, after calculating some of the missing chrominance values in the second line of the buffer.

FIG. 5 shows a schematic depiction of the calculation of the remaining missing chrominance values on second line 204. The remaining missing chrominance values on second line 204 are indicated at 224, and are calculated from the chrominance values previously calculated for positions 220. As with the calculations of the other missing chrominance values described above, the actual calculations used to fill in the remaining missing chrominance values on second line 204 are known to one skilled in the art, and are thus not discussed in detail.

Due to the relatively small size of decompression buffer 200 compared to the amount of data in an entire image, it is likely that few cache misses will be generated by the decompression calculations described above for the initial subset of image data, even where the image encoded by the data is in a high resolution format. Furthermore, because decompression buffer 200 holds three lines of image data, subsampled chrominance values may be used to calculate missing chrominance values in vertically adjacent positions. It will be appreciated that the three-line configuration of decompression buffer 200 is merely exemplary, and that a decompression buffer according to the present invention may be configured to hold any other suitable number of lines of image data.

Referring again to FIG. 2, after completing the calculation of the missing chrominance values in the initial subset of subsampled image data, the decompressed image data is output from the buffer at 112. The decompressed image data is typically output to an output buffer configured to hold an entire decompressed image, and may be output in any suitable manner. For example, all three lines of the image data may be output, or a smaller subset of image data may be output. In the embodiment of FIG. 2, only the decompressed data from the first and second lines are output. It will be appreciated that other steps may be performed after decompressing the subset of subsampled image data before outputting the decompressed data. For example, a color conversion from a luminance/chrominance color space to an RGB color space may also be performed before outputting the data.

Outputting two lines of data, instead of all three lines of data, from decompression buffer 200 may offer advantages over outputting all three lines of data. For example, outputting two lines of data and resetting the third line to be the first line always results in the subsampled chrominance values occupying the first and third lines of the buffer (assuming lines of image data are read into the decompression buffer in an incremental order). This may help to simplify the decompression calculations where a plurality of subsets of the subsampled image data are decompressed.

Figure 6:
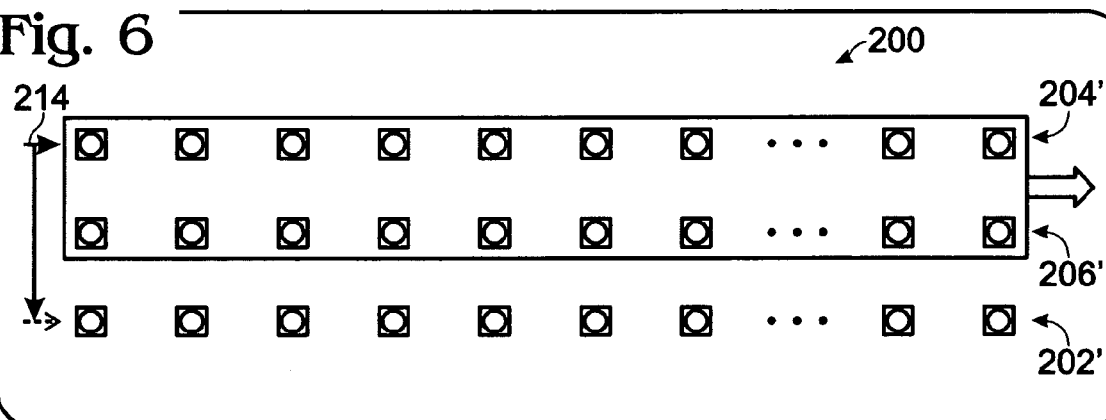
FIG. 6 is a schematic depiction of the buffer of FIG. 3, after calculating the remaining missing chrominance values in the second and third lines of the buffer.

At this point, the decompressor program determines at 114 whether the set of subsampled image data is completely decompressed. Where the set of subsampled image data is not completely decompressed, first line pointer 214 is reset at 116 to point at third line 206, as shown schematically in FIG. 6. This resets third line 206 as a first line 202' of buffer 200 for performing decompression calculations. At the time first line pointer 214 is reset, first line 202 is also reset as second line 204' of the buffer, and second line 204 is reset as third line 206' of the buffer. This is a circular ring buffer of three lines.

Resetting first line pointer 214 allows the third line to be reset as the first line without shifting the positions of any of the third line image data values in memory. Thus, resetting first line pointer 214 may be a faster and more efficient method of resetting the third line as the first line than shifting image data values within the decompression buffer. Alternatively, the third line of the buffer may be reset as the first line of the buffer by shifting the image data values in the third line to the first line.

Figure 7:
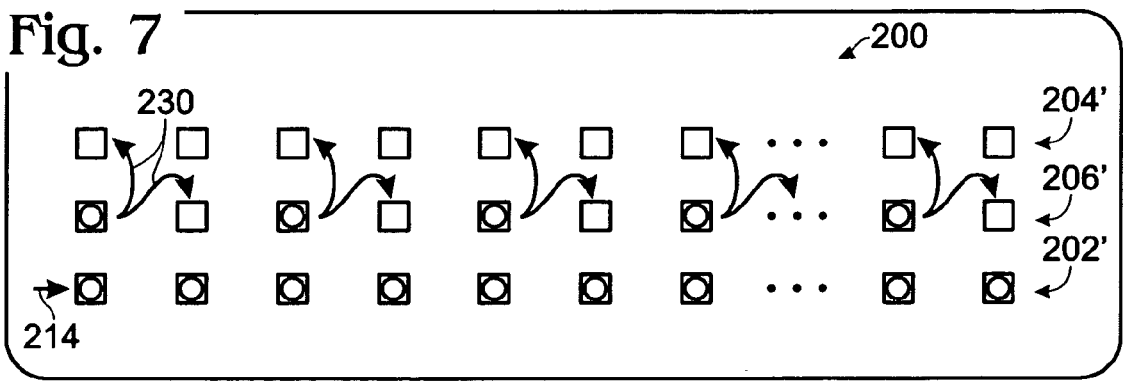
FIG. 7 is a schematic depiction of the buffer of FIG. 3, after outputting the first two lines of decompressed image data from the buffer, resetting the first line pointer, and reading two new lines of compressed image data into the buffer.

After resetting at 116 the assignments of the lines in the buffer to first, second and third lines 202', 204' and 206' respectively, a new two-line subset of subsampled image data is read at 118 into second line 204' and third line 206', and method 100 loops back to step 108 to calculate the missing chrominance values on the third line at 108 and on the second line at 110. These calculations are indicated schematically by arrows 230 in FIG. 7. Method 100 continues to loop through steps 108–118 until the set of subsampled image data has been completely decompressed. As this loop is repeated, pointer 214 rotates repeatedly through the lines of the buffer, moving from first line 202, to third line 206, and back to first line 202.

Once the set of subsampled image data has been completely decompressed, the loop is broken at step 114, and the decompressed data in the third line of decompression buffer 200 is output from the buffer at 120. It will be appreciated that, depending upon the format of the image encoded in the set of subsampled image data, the final subset of image data read into buffer 200 may have only one line of data, rather than two. In this case, the missing chrominance values of that line may be calculated from the decompressed data in the current first line of the buffer, and then both lines may be output.

While decompression buffer 200 is disclosed as being configured to hold an A×C array of image data, wherein C=3, it will be appreciated that other buffer configurations may also be used. For example, where the image data is arranged in an A×B array, a decompression buffer according to the present invention may have a C×B configuration, wherein C is less than A, or even a C×D configuration, wherein C and D are less than A and B, respectively.

Furthermore, although the present disclosure includes specific embodiments, specific embodiments are not to be considered in a limiting sense, because numerous variations are possible. The subject matter of the present disclosure includes all novel and nonobvious combinations and subcombinations of the various elements, features, functions, and/or properties disclosed herein. The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. A method of decompressing a set of subsampled image data, wherein the subsampled image data is arranged in an A×B array of pixels, the method comprising:
   reading a first subset of the subsampled image data into a cache memory and into a buffer, wherein the buffer has an amount of memory equal to or less than the cache memory, and is configured to hold an A×C array of pixels of the decompressed image data, wherein C is less than B;
   calculating chrominance values for at least some pixels of the subset of the subsampled image data to form decompressed image data; and
   outputting the decompressed image data.

2. The method of claim 1, wherein the buffer is configured to hold an A×3 array of pixels of the decompressed image data.

3. The method of claim 1, wherein the subsampled image data is 4:2:0 cosited image data.

4. The method of claim 3, wherein the buffer has a first line, a second line and a third line, and wherein the first line and the third line contain sampled chrominance values of the subsampled image data.

5. The method of claim 4, wherein calculating chrominance values includes calculating missing chrominance values for the first line from sampled chrominance values on the first line, calculating missing chrominance values for the third line from sampled chrominance values on the third line, and then calculating missing chrominance values on the second line from the sampled chrominance values on the first and third lines.

6. The method of claim 5 further comprising outputting the decompressed image data from the first and second lines to an output buffer after calculating the missing chrominance values for the first and second lines, and resetting the third line as the first line.

7. The method of claim 6, wherein resetting the third line as the first line includes resetting the first line as the second line and resetting the second line as the third line.

8. The method of claim 7, further comprising reading a new subset of subsampled image data into the second line and third line after resetting the first line as the second line and resetting the second line as the third line.

9. The method of claim 1, further comprising reading a second subset of the subsampled image data into the cache memory and into the buffer after outputting the decompressed image data.

10. The method of claim 9, further comprising iteratively reading subsets of the subsampled image data into the cache memory and into the buffer, calculating chrominance values for at least some pixels of each subset of the subsampled image data, and outputting the decompressed image data until the subsampled image data has been completely decompressed.

11. The method of claim 1, wherein the decompressed image data is output to an output buffer configured to hold a complete set of decompressed image data.

12. The method of claim 1, wherein the buffer is configured to hold an A×C array of the decompressed image data, and wherein outputting the decompressed image data includes outputting an A×D array of the decompressed image data, wherein D is less than C.

13. The method of claim 12, further comprising reading in another A×D array of subsampled image data after outputting the A×D array of the decompressed image data.

14. The method of claim 12, wherein C is equal to three, and wherein D is equal to two.

15. A method of decompressing a set of subsampled image data, wherein the image data is arranged in an A×B array of pixels, the method comprising:
   (a) reading a first subset of subsampled image data into a cache memory and into an decompression buffer configured to hold an A×C array of pixels of decompressed image data, wherein C is less than B;
   (b) calculating chrominance values for at least some pixels of the subsampled image data to form the decompressed image data;
   (c) outputting an A×D array of pixels of the decompressed image data to an output buffer, wherein D is less than or equal to C;

(d) reading another subset of the subsampled image data into the cache memory and into the decompression buffer, wherein the second subset of the subsampled image data has A×D pixels of image data; and (e) repeating (b)–(d) until the set of subsampled image data is fully decompressed.

16. The method of claim 15, wherein the decompression buffer has an amount of memory equal to or less than the cache memory.

17. The method of claim 16, wherein the subsampled image data is 4:2:0 cosited image data.

18. The method of claim 17, wherein C is equal to three.

19. The method of claim 18, wherein the buffer has a first line, a second line and a third line, and wherein outputting an A×D array of pixels of the decompressed image data includes outputting decompressed image data from the first line and the second line.

20. The method of claim 19, further comprising resetting the third line as the first line before reading in another subset of the subsampled image data.

21. The method of claim 18, wherein D is equal to two.

22. An image processing device for decompressing subsampled image data, wherein the subsampled image data is arranged into an A×B array of pixels, the image processing device comprising:
buffer memory configured to receive a set of the subsampled image data for processing, wherein the buffer memory is configured to hold an A×C array of pixels of the image data, and wherein C is less than B;
cache memory configured to receive the set of subsampled image data and to hold the set of subsampled image data during processing, wherein the cache memory has sufficient size to store the A×C array of pixels of the image data; and
a processor configured to calculate chrominance values for the set of subsampled image data held in the buffer memory.

23. The image processing device of claim 22, wherein the buffer memory is smaller than the cache memory.

24. The image processing device of claim 22, wherein the buffer memory is configured to hold three lines of image data.

25. The image processing device of claim 22, wherein the subsampled image data is 4:2:0 cosited image data.

26. The image processing device of claim 25, wherein the buffer memory has a first line, a second line and a third line, and wherein the first line and the third line are configured to contain image data having sampled chrominance values.

27. The image processing device of claim 26, wherein the processor is configured to calculate missing chrominance values for the first line from sampled the chrominance values on the first line, missing chrominance values for the third line from sampled chrominance values on the third line, and missing chrominance values on the second line from the sampled chrominance values on the first and third lines.

28. The image processing device of claim 27, wherein the processor is configured to output the decompressed image data from the first and second lines to an output buffer after calculating the missing chrominance values for the first and second lines, and to then reset the third line as the first line.

29. The image processing device of claim 28, wherein the processor is configured to reset the first line as the second line and to reset the second line as the third line when resetting the third line as the first line.

30. The method of claim 29, further comprising reading in a new subset of subsampled image data into the second line and third line after resetting the first line as the second line and resetting the second line as the third line.

31. On a computer-readable storage medium, a program including a set of instructions executable by a computing device to process subsampled image data, wherein the subsampled image data is arranged in an A×B array of pixels, the set of instructions being executable by the computing device to:
read a first subset of the subsampled image data into a cache memory and into a buffer, wherein the buffer has an amount of memory equal to or less than the cache memory, and is configured to bold an A×C array of pixels of the decompressed image data, wherein C is less than B;
calculate chrominance values for at least some pixels of the subset of the subsampled image data to form decompressed image data; and
output the decompressed image data.

32. The program of claim 31, wherein the buffer is configured to hold an A×3 array of pixels of the decompressed image data.

33. The program of claim 31, wherein the subsampled image data is 4:2:0 cosited image data.

34. The program of claim 33, wherein the buffer has a first line, a second line and a third line, and wherein the first line and the third line contain sampled chrominance values of the subsampled image data.

35. The program of claim 33, wherein the instructions are executable to calculate chrominance values by calculating missing chrominance values for the first line from sampled chrominance values on the first line, calculating missing chrominance values for the third line from sampled chrominance values on the third line, and then calculating missing chrominance values on the second line from the sampled chrominance values on the first and third lines.

36. The program of claim 35, wherein the instructions are executable to output the decompressed image data from the first and second lines to an output buffer after calculating the missing chrominance values for the first and second lines, and to reset the third line as the first line.

37. The program of claim 36, wherein the instructions are executable to reset the first line as the second line and the second line as the third line when the third line is reset as the first line.

38. The program of claim 31, wherein the instructions are executable to read a second subset of the subsampled image data into the cache memory and into the buffer after outputting the decompressed image data.

39. The program of claim 38, wherein the instructions are configured to iteratively read subsets of the subsampled image data into the cache memory and into the buffer, calculate chrominance values for at least some pixels of each subset of the subsampled image data, and output the decompressed image data until the subsampled image data has been completely decompressed.

40. The program of claim 31, wherein the instructions are executable to output the decompressed image data to an output buffer configured to hold a complete set of decompressed image data.

* * * * *